(12) United States Patent
Mann et al.

(10) Patent No.: US 9,562,177 B2
(45) Date of Patent: Feb. 7, 2017

(54) STARCH-BASED GLUE COMPOSITION

(75) Inventors: Karl-Jürgen Mann, Vienna (AT); Martin Kozich, Vienna (AT); Dietmar Grüll, Langenschönbichl (AT); Marnik Michel Wastyn, Schwechat (AT)

(73) Assignee: Agrana Staerke GmbH, Gmuend (AT)

( * ) Notice: Subject to any disclaimer, the term of this patent is extended or adjusted under 35 U.S.C. 154(b) by 1088 days.

(21) Appl. No.: 13/296,865

(22) Filed: Nov. 15, 2011

(65) Prior Publication Data

US 2012/0121873 A1    May 17, 2012

(30) Foreign Application Priority Data

Nov. 15, 2010  (EP) ..................................... 10191147

(51) Int. Cl.
| | | |
|---|---|---|
| *C08B 31/00* | (2006.01) | |
| *C08L 3/04* | (2006.01) | |
| *C09J 103/04* | (2006.01) | |
| *C09J 103/00* | (2006.01) | |

(52) U.S. Cl.
CPC ....... *C09J 103/00* (2013.01); *Y10T 428/24802* (2015.01); *Y10T 428/24934* (2015.01)

(58) Field of Classification Search
CPC ............ C08B 31/00; C08L 3/04; C09J 103/04
See application file for complete search history.

(56) References Cited

U.S. PATENT DOCUMENTS

| | | | |
|---|---|---|---|
| 5,753,468 | A | 5/1998 | Henley |
| 6,248,566 | B1 * | 6/2001 | Imanaka et al. ................. 435/72 |
| 6,858,717 | B1 * | 2/2005 | Ball ............................ 536/23.2 |
| 2003/0109010 | A1 | 6/2003 | Fuertes et al. |
| 2003/0166919 | A1 * | 9/2003 | Cooke et al. .................. 536/102 |
| 2004/0112559 | A1 * | 6/2004 | Du Bourg et al. ........... 162/175 |
| 2005/0089624 | A1 * | 4/2005 | King et al. .................... 426/658 |
| 2009/0022872 | A1 * | 1/2009 | Nishimoto et al. ........... 426/590 |
| 2009/0142812 | A1 | 6/2009 | Skuratowicz et al. |
| 2010/0099864 | A1 * | 4/2010 | van der Maarel et al. ... 536/102 |
| 2010/0258037 | A1 * | 10/2010 | Mann et al. .................. 106/804 |
| 2015/0050437 | A1 * | 2/2015 | Kozich et al. ............... 428/34.1 |

FOREIGN PATENT DOCUMENTS

EP    0690170 A1    1/1996

OTHER PUBLICATIONS

Kawabata et al.: "Preparation of highly branched starch by glycogen branching enzyme from Neurospora Crassa N2-44 and its characterization", J. Appl. Glycosci., vol. 49, No. 3, pp. 273-279, 2002, XP002617805.
Kajiura et al.: "Structure and solution properties of enzymatically synthesized glycogen", Carbohydrate Research, vol. 345, No. 6, 2010, pp. 817-824, XP026984255.
Hizukuri et al.: "Multi-branched nature of amylose and the action of de-branching enzymes", Carbohydrate Research, vol. 94, 1981, pp. 205-213.
Nilsson et al.: "Determination of the Degree of Branching in Normal and Amylopectin Type Potato Starch with 1H-NMR Spectroscopy—Improved resolution and two-dimensional spectroscopy", Starch/Starke, vol. 48, No. 10, 1996, pp. 352-357.
Takata et al.: "Properties and Active Center of the Thermostable Branching Enzyme from *Bacillus stearothermophilus*", Applied and Environmental Microbiology, Sep. 1994, pp. 3096-3104, 1994, American Society for Microbiology.
Morton et al.: "Starch Derivatives: Production and Uses", Starch, 2nd Ed., Chapter X, 1984, Academic Press, Inc.
Rohwer et al.: "Acid-Modified Starch: Production and Uses" Starch, 2nd Ed., Chapter XVII, 1984, Academic Press, Inc.
Wurzburg: "Converted Starches" Modified Starches, Chapters 2-6, CRC Press, 1986.
Trubiano: Succinate and Substituted Succinate Derivatives of Starch, Modified Starches, Chapters 9-11, CRC Press, 1986.
Solarek: "Cationic Starches" Modified Starches:Properties and Uses, Chapter 9, CRC Press Inc., Boca Raton, FL, 1986, pp. 113-130.

* cited by examiner

*Primary Examiner* — Liam J Heincer
(74) *Attorney, Agent, or Firm* — Laurence A. Greenberg; Werner H. Stemer; Ralph E. Locher (57) ABSTRACT

A highly homogeneous starch-based glue composition is obtained by enzymatic modification of the starch with a branching enzyme which is supplied in an enzymatically modified starch with high long-term stability. The starch has a viscosity stability index SI of less than or equal to 1.3, calculated by the quotient of viscosity after 14 days and by viscosity after 2 hours after preparation of the starch. The starch is suitable for liquid storage, which is stable in the long-term, of a ready-to-use paste with a high bonding strength.

43 Claims, 2 Drawing Sheets

STARCH-BASED GLUE COMPOSITION

CROSS-REFERENCE TO RELATED APPLICATION

This application claims the priority, under 35 U.S.C. §119, of European application EP 10191147.7, filed Nov. 15, 2010; the prior application is herewith incorporated by reference in its entirety.

BACKGROUND OF THE INVENTION

Field of the Invention

The present invention relates to a glue composition based on enzymatically modified starch (EMS) which has been treated with a branching enzyme and has a highly homogeneous molar mass distribution and excellent bonding properties.

Starch is a polymer formed of glucose units which are linked by alpha-1,4 glycoside and alpha-1,6 glycoside bonds. More highly branched starch contains additional alpha-1,6 glycoside linkages. In principle, a differentiation is made between two fractions of the starch, namely amylose and amylopectin. Amylose consists of virtually unbranched chains of anhydroglucose units (AGU) which are preferably linked by alpha-1,4 glycoside linkages. In amylopectin, numerous anhydroglucose units are linked to one another in a similar manner, but the molar mass and the number of branchings are considerably higher. The degree of branching of natural amylopectin is generally approximately 3 to 4%, and therefore 96 to 97 of the 100 bonds between the anhydroglucose units are alpha-1,4 bonds and 4 to 3 are 1,6 bonds. The amount of amylopectin is by far predominant in the types of starch used in industry and is generally approximately 80%. For example, the proportion of amylose is thus 23% in maize, 19% in wheat, 14% in rice, 18% in potatoes and approximately 3% (average value) in waxy maize starch.

In addition to the different degree of branching, the degree of polymerization of amylopectin and amylose is also different. For example, in maize starch the degrees of polymerization (number of linked anhydroglucose units per starch molecule) in the case of amylose are between 260 and 800, and in the case of amylopectin they are between 280 and 35,000. Greater degrees of polymerization are present in potato starches: in the case of amylose they are from 240 to 3,800, and for amylopectin they are between 1,100 and 220,000.

Native starch is present in nature in the form of starch granulate and granules and is solubilized, if necessary, for different industrial applications. Since native starch is not water-soluble, it is converted into a soluble form at increased temperature or by the action of alkali. However, the amylose fraction is generally poorly soluble and may form crystalline aggregates by hydrogen bridge formation after cooling. This process is called retrogradation. Amylopectin is generally more soluble and less susceptible to retrogradation. However, long-term stability of a solution cannot be obtained, even with amylopectin starches.

In packaging technology, the demand for high operating speeds in the case of mechanical paper processing increases continuously. Running properties of the glue, tightness and gluability of the packaging papers as well as the drying rate of the glues used are essential elements. In order to produce a large number of packagings per unit of time, the glue applied must set as quickly as possible. The glued seams should have solidified within a few seconds, at least to the extent that it is possible to transport the packaging in the packaging line.

Starch is a widespread starting material for glues. According to DIN 16.920, glues are understood to be non-metal substances which bond parts to be joined by surface attachment and inner strength. "Glue" is a generic term and includes other conventional terms which have been selected according to physical, chemical or processing viewpoints, such as gum, paste, dispersion glue, contact or pressure-sensitive glue and the like. Pure adhesives differ from real glues and can only be applied as surface treatment agents, such as coating or sizing agents.

Starch glues or coating agents are generally obtained by heating starch. This leads to the breaking open of the starch granules and to the formation of a fluid starch cone. In this form, starch is not present as a dissolved substance, but as a colloid suspension. Such a paste already has high viscosity and can be used as a gluing or coating agent. Modern starch glues or pastes can be modified to reduce viscosity and to obtain gluing or coating agents which are as stable as possible. These treatments may be enzyme, physical and/or chemical treatment steps, such as alkali treatment, acid treatment and oxidation. The gel-formation temperature can also be reduced by such methods, and therefore the starch is present in gel form even at room temperature.

In recent decades, synthetic glues based on polyvinyl alcohol or polyvinyl acetate have become established and are obtainable with solid contents of up to 65%. In spite of this, starch-based glues do afford some considerable advantages over synthetic glues:

1. renewable raw material (Green Label);
2. no environmentally harmful volatile components in the drying air;
3. maximum reduction of the amount of glue at the glue gap;
4. simple removal of glue residues;
5. uncomplicated handling; and
6. very good flowability.

Dextrins are (highly) degraded and hydrolytically cleaved starch products.

During formation of dextrins, starch is cleaved into small polymer fragments by heating and acid treatment, these fragments possibly re-polymerizing to form a highly branched polymer of medium size. Depending on different acid and heat treatment, a distinction is made between white dextrins and yellow dextrins. Maltodextrins are produced by the enzymatic degradation of starch with amylases. Different products are obtained depending on the type of amylase. The proportion of reducing ends and thus the DE value increases by the hydrolytic cleaving of the starch into smaller fragments. In contrast to starch, dextrins are normally soluble in water. However, a retrogradation during longer liquid storage may occur, even with dextrins, and this is particularly the case at high concentrations.

The field of application of starch-containing glues extends from widespread industrial use to day-to-day glues, in which in particular the biodegradability and environmentally friendly production are advantageously apparent. Starch glues are thus often used for wall coverings and wallpapers, for cigarette production and packaging, for labeling of bottles, for envelopes, in the production of book covers or in the gluing of paper. In the paper industry, starch is also used as a coating agent, for example to ensure dye fastness. Depending on the application, soluble starch derivatives, thin boiling starches having a specific solid proportion and even tough, resilient and ropey pastes are used. In particular when gluing printed paper materials, a low viscosity and a uniform applicability of the starch is required and leads to no or little swelling and associated deformation of the paper. In addition, the starch must have a high bond strength. These properties are often at odds in conventional starches.

Published, European patent application EP 0 990 687 A2 describes a glue based on amylopectin potato starch. Amylopectin potato starch is a special amylopectin starch which is produced by a genetically modified potato which has been inhibited in terms of its amylose formation. This amylopectin potato starch has special properties, is highly molecular and is generally modified or degraded in part for special applications.

Published, European patent EP 1 369 432 A2 relates to a highly branched starch for use in the foodstuff and pharmaceutical industries. This starch is produced by using a branching enzyme and is characterized by a biologically compatible osmolarity. The osmolarity is optimally adjusted in particular to the gut environment. The branching enzyme used originates for example from the microorganism *B. Stearothermophilus* or *Chlamydomonas reinhardtii*, as described in international patent application WO 00/18893 A1. These starches obtained (ultimately only also suitable for the foodstuff and pharmaceutical industries) are not suitable as a glue, but do promote controlled digestion.

U.S. published patent application 2003/0109010 relates to methods for modifying starch by use of branching enzymes, for example from *E. Coli*, potato, *Bacillus Megaterium* or *Bacillus Stearothermophilus*. Owing to the use of the branching enzymes, the degree of branching and the proportion of reducing sugars are increased, and the average molar mass and viscosity are reduced. The modified starches are in particular used to change the nature of foodstuffs and oral sensation.

International patent publication WO 03/106502 A1 relates to enzymatically branched dextrins having a degree of polymerization (DP) of more than 4,000 which are basically free from cyclic structures. In this case, a branching enzyme of the *Rhodothermus* species, such as *Rhodothermus Obamensis* or *Rhodothermus Marinus* is used. These branching enzymes were first described in international patent publication WO 00/58445 A1. Highly branched starches are to be used as an additive for foodstuffs or in beverages or as a coating or sizing agent in the paper industry.

European patent EP 0 690 170 B1 relates to a method for the surfacesizing of paper (pure surface treatment) using a starch-based sizing agent. This starch may be modified by a branching enzyme (E.G. 2.4.1.18) or a cyclodextrin glucosyltransferase (E.G. 2.4.1.19).

SUMMARY OF THE INVENTION

The object of the present invention is to provide new glues which have low viscosity, inter alia with high solid content, an extremely high adhesive force and prominent long-term stability in liquid form so that storage is enabled in the form of a liquid composition. The object was solved by a glue composition according to the invention which contains enzymatically modified starch which was artificially modified by modifying a starting starch using a branching enzyme. In this case, this object was achieved by the subject matters of the claims. In accordance with the present invention it was found that these specifically modified starch derivatives, based on the enzymatic modification by means of a branching enzyme, exhibit an extremely high bond strength. In addition, these starch derivatives have the advantage of an extremely high long-term stability in liquid or aqueous form. Previous starch glues or pastes were only provided as solids to be introduced shortly before use owing to a lack of long-term stability. The present invention now allows the use of liquid, in particular aqueous starch-containing glue compositions which can be stored for months or more without thickening and without setting.

In a specific embodiment the present invention therefore relates to a glue composition containing enzymatically branched starch having a viscosity stability index (SI) of less than or equal to 1.3, calculated by the quotient from viscosity after 14 days and viscosity after 2 hours after preparation of the composition.

These enzymatically modified starches can be used successfully for gluing. The present invention therefore primarily relates to a glue composition or a paste. Here, "starch" not only refers to the starting material (native or modified starch for treatment with the enzyme), but also to the enzymatically modified products according to the invention which are obtainable by in vitro treatment with a branching enzyme.

In specific embodiments these starches have a DE (dextrose equivalent) value of less than or equal to 1. The dextrose equivalent (DE) of a polysaccharide mixture denotes the proportion in percent of reducing sugars in the dry substance. It corresponds to the amount of glucose (=dextrose) which has the same reduction capability per 100 g of dry substance. The DE value is a measure for how far hydrolytic polymer degradation has progressed, and therefore products with a low DE value have a high proportion of polysaccharides and a low content of low-molecular sugars, whereas products with a high DE value primarily consist merely of low-molecular sugars. The dextrose equivalent of starch is 0, that of glucose is 100. The dextrose equivalent of maltodextrin is between 3 and 20 depending on the degree of hydrolysis. Products with DE values of more than 20 are assigned to glucose syrups.

The extremely low DE value of the starch derivatives according to the invention shows that the starch molecules differ from starch molecules obtainable by hydrolytic cleaving (as in alpha-amylases) (for example maltodextrins). In specific embodiments the DE value is less than or equal to 1, less than or equal to 0.9, less than or equal to 0.8, less than or equal to 0.7, less than or equal to 0.6. less than or equal to 0.5, less than or equal to 0.4, less than or equal to 0.35, less than or equal to 0.3, less than or equal to 0.25, less than or equal to 0.2, or less than or equal to 0.1. For example, in the prior art the DE value may be calculated by conventional methods, such as by the Fehling method. Alternatively, the modified Park-Johnson Method of Hizukuri et al. (Carbohydrate Research, 94: 205-213 (1981)) may also be used to calculate low proportions at reducing ends. It is particularly noticeable that the starch derivatives according to the invention demonstrate an extremely homogeneous molar mass distribution which can be adjusted by the amount of enzyme used and by the reaction time. Without being limited to a specific theory, it appears that large starch molecules are thus distributed towards this smaller area and smaller starch molecules are collected, wherein all starch molecules are additionally branched and thus have a greater degree of branching than the starting starch.

A further preferable advantage of the enzymatically modified starches according to the invention is that they are color-neutral or white. In contrast to colored roast dextrins for example, branched starch products are thus obtained which are suitable for the gluing of objects (which are transparent at least in part). Objects or products in which the glues are visible or could become visible can thus be glued without difficulty. In particular, this is a requirement in numerous applications in the paper or cardboard industry. The color "white" corresponds to a subjective perception by a person that all three cones in the retina of the eye are affected in a similar manner and with sufficiently high intensity. The RGB system was thus developed for color representation and mirrors the behavior at the retina. According to the RGB system, "pure white" is 1.0, 1.0, 1.0 (or 100%, 100%, 100%) for the red, green and blue light proportion. According to the present invention, "white" or "color-neutral" are to be understood when these light proportions are approximately equal, in particular are within 5%, preferably 3% and specifically within 1% deviation from one another at most.

In specific embodiments the mean molar mass Mn (number average) of the starch is 40 kDa (kilo Daltons) to 600 kDa, measured by light scattering. The modified starch according to the invention has particularly preferable properties in the form of a mean molar mass Mn (number average) from 40 kDa, established by light scattering. In especially preferred embodiments the mean molar mass Mn is at least 45 kDa, at least 50 kDa, at least 53 kDa, at least 55 kDa or at least 60 kDa, measured by light scattering. In preferred embodiments the upper limit of mean molar mass Mn is less than or equal to 600 kDa, less than or equal to 550 kDa, less than or equal to 500 kDa, less than or equal to 450 kDa, less than or equal to 400 kDa, less than or equal to 350 kDa, less than or equal to 300 kDa, less than or equal to 250 kDa, less than or equal to 200 kDa, less than or equal to 150 kDa, less than or equal to 100 kDa, less than or equal to 90 kDa, less than or equal to 85 kDa, less than or equal to 80 kDa or less than or equal to 70 kDa, measured by light scattering.

When determining the molar mass of starch, a distinction has to be made between two basic methods, namely the determination of molar mass by light scattering and the determination of molar mass relative to known standard substances (conventional SECS). In both cases the molecules are separated in a column system with porous filling in accordance with their hydrodynamic volume (molecule size in solution) and are then analyzed by means of a concentration detector, more specifically an RI (refractive index) detector. The elugram thus obtained (signal intensity compared to elution volume) can be calibrated with the aid of standards of known and narrow molar mass distribution (more specifically with Pullulan standards). If a molar-mass-sensitive detector (such as a multi-angle laser light scattering or MALLS detector) is also used in addition to the concentration detector, the molar mass can be determined directly from the signals of the two detectors. Since the enzymatically branched starch derivatives according to the invention differ greatly in terms of elution behavior from linear molecules, which are used as standards, the assessment of molar mass determination by light scattering behavior is preferred.

Provided the conventional SEC with the Pullulan standard is to be used as a reference, in preferred embodiments the mean molar mass Mn of the starches according to the invention is greater than or equal to 10 kDa, greater than or equal to 11 kDa, greater than or equal to 12 kDa, greater than or equal to 13 kDa, or greater than or equal to 14 kDa. In accordance with this embodiment, the mean molar mass is preferably less than or equal to 50 kDa, less than or equal to 40 kDa, less than or equal to 30 kDa, or less than or equal to 20 kDa, measured by conventional SEC with Pullulan calibration.

In addition to the number average of the molar mass (Mn), the weight average (Mw) is also characteristic for a starch composition. The weight average is greater than the number average owing to the greater weighting of the higher molecular starch molecules. In preferred embodiments the mean molar mass Mw (weight average) of the starch, measured by light scattering, is from 60 kDa to 3000 kDa, and it is particularly preferred if the mean molar mass Mw is at least 70 kDa, in particular preferably at least 80 kDa, at least 90 kDa, at least 100 kDa, at least 105 kDa, at least 110 kDa, at least 115 kDa, at least 120 kDa, at least 125 kDa, or at least 130 kDa. The mean molecular weight Mw of the starch, measured by light scattering, is more preferably less than or equal to 3,000 kDa, less than or equal to 2,900 kDa, less than or equal to 2,800 kDa, less than or equal to 2,700 kDa, less than or equal to 2,600 kDa, less than or equal to 2,500 kDa, less than or equal to 2,400 kDa, less than or equal to 2,300 kDa, less than or equal to 2,200 kDa, less than or equal to 2,100 kDa, less than or equal to 2,000 kDa, less than or equal to 1,900 kDa, less than or equal to 1,800 kDa, less than or equal to 1,700 kDa, less than or equal to 1,600 kDa, less than or equal to 1,500 kDa, less than or equal to 1,400 kDa, less than or equal to 1,300 kDa, less than or equal to 1,200 kDa, less than or equal to 1,100 kDa, less than or equal to 1,000 kDa, less than or equal to 900 kDa, less than or equal to 800 kDa, less than or equal to 700 kDa, less than or equal to 600 kDa, less than or equal to 500 kDa, less than or equal to 400 kDa, less than or equal to 300 kDa, less than or equal to 200 kDa, less than or equal to 170 kDa, less than or equal to 150 kDa, less than or equal to 140 kDa, less than or equal to 135 kDa, less than or equal to 130 kDa, less than or equal to 125 kDa, less than or equal to 120 kDa, less than or equal to 115 kDa or less than or equal to 110 kDa.

A further characteristic variable of the enzymatically modified starches according to the invention is the polydispersity index (PDI), which is determined by the ratio of Mw:Mn. The polydispersity corresponds to the breadth of distribution of the molar mass profile of a heterogeneous, that is to say non-uniform, starch. However, it may be found that the starch modified in accordance with the invention is highly homogeneous relative to other starches, in particular to starting starches. The polydispersity index (PDI) of the products according to the invention is normally between 1 and 5. In specifically preferred embodiments the polydispersity index is less than 4, less than 3.5, less than 3, less than 2.5, less than 2.25, less than 2, less than 1.9, less than 1.8, less than 1.7, less than 1.6, less than 1.5, or less than 1.4, wherein in this case the molar masses Mw and Mn as determined by light scattering are used. Similar, yet slightly higher polydispersity indices can be obtained with molar mass determination by conventional SEC. In this case the polydispersity indices are preferably less than 5, less than 4.5, less than 4, less than 3.75, less than 3.5, less than 3.25, less than 3, less than 2.75, less than 2.5, less than 2.25, or less than 2. The molar mass profile, for example by size-exclusion chromatography, preferably has merely a single peak with a monomodal molar mass distribution, in particular preferably as shown in the figures. In preferred embodiments at least 50% (% by weight) of the starch, preferably at least 60%, at least 70%, at least 80%, or at least 90% is associated with this peak.

The starches modified in accordance with the invention which are suitable for the glue compositions according to the invention preferably have no, or low proportions of cyclic structures or are substantially free from cyclic structures. In specific embodiments the starch has less than 8% cyclic structures in particular. All glucose units of the starch molecule which are involved in a ring structure are understood to be a cyclic starch structure. Side chains, either branched or linear, are not considered to be a ring structure if there is no ring closure within these side chains. In particular, the proportion of anhydroglucose units in cyclic radical structures of the starch after treatment with glucoamylase is accordingly less than 8% of the starch mass.

The starch modified in accordance with the invention preferably does not differ in this area from conventional starch products, such as maltodextrins. After removal of the branchings, for example by glucoamylase, the starches according to the invention and conventional maltodextrins form similar residues.

An enzymatically modified starch according to the invention is considered to be substantially free from cyclic structures if the proportion of glucose units of cyclic structures is less than 8% of the starch mass, preferably less than 7.5%, less than 6%, less than 5.5%, less than 5%, less than 4.75%, less than 4.5%, less than 4.25%, less than 4%, less than 3.75%, less than 3.5%, less than 3.25%, less than 3%, less than 2.75%, less than 2.5%, less than 2.25%, less than 2%, less than 1.75%, less than 1.5%, less than 1.25%, less than 1%, less than 0.75%, less than 0.5%, less than 0.25%, less than 0.1%, or even 0%. When determining the proportion of glucose units in cyclic starch structures, it is understood that only such a proportion which lies above the blank value of the measurement method can be assessed. The blank value may be determined using known non-cyclic starch structures. Suitable reference starches are thus normally the starting starches, which are used as a starting material for the enzymatic modification according to the invention of the starch using a branching enzyme to prepare the starch according to the invention.

In other embodiments cyclic structures may be contained in the starch. Cyclic structures may be introduced by suitable enzymes, such as cyclodextrin glucotransferases or the like. In some embodiments the starch may therefore contain from 0.1% to 15%, preferably 0.5% to 11%, in particular preferably 1% to 8%, more specifically preferably 2% to 5% of cyclic ring structures.

In the case of more strongly branched starches with lower molar masses, greater proportions of cyclic by-products are generally tolerated, and therefore, preferably in starches with a molar mass of less than 60 kDa (mean molar mass Mn), determined by light scattering, and irrespective of the above-mentioned total proportions of glucose units in cyclic starch structures, the proportion of glucose units in cyclic starch structures is preferably less than 10%, less than 9.5%, less than 9%, less than 8.5%, less than 8%, less than 7%, less than 6%, less than 5%, or less than the above-mentioned proportions.

In preferred embodiments the viscosity of the starch in the composition in a (pure) aqueous 40% (% by weight in the dry substance) solution is less than 1,500 mPas, preferably less than 1,200 mPas, less than 1,000 mPas, less than 800 mPas, less than 600 mPas, or less than 500 mPas and/or at least 100 mPas, at least 150 mPas, at least 200 mPas, at least 250 mPas, or at least 300 mPas. In the form of a 50% (% by weight) solution of the starch, the viscosity is in particular preferably at least 100 mPas, at least 150 mPas, at least 200 mPas, at least 250 mPas, at least 300 mPas and/or up to 8,000 mPas, up to 7,900 mPas, up to 7,800 mPas, up to 7,700 mPas, up to 7,600 mPas, up to 7,500 mPas, up to 7,400 mPas, up to 7,300 mPas, up to 7,200 mPas, up to 7,100 mPas, up to 7,000 mPas, up to 6,900 mPas, up to 6,800 mPas, up to 6,700 mPas, up to 6,600 mPas, up to 6,500 mPas, up to 6,400 mPas, up to 6,300 mPas, up to 6,200 mPas, up to 6,100 mPas, up to 6,000 mPas, up to 5,900 mPas, up to 5,800 mPas, up to 5,700 mPas, up to 5,600 mPas, up to 5,500 mPas, up to 5,400 mPas, up to 5,300 mPas, up to 5,200 mPas, up to 5,100 mPas, up to 5,000 mPas, up to 4,900 mPas, up to 4,800 mPas, up to 4,700 mPas, up to 4,600 mPas, up to 4,500 mPas, up to 4,400 mPas, up to 4,300 mPas, up to 4,200 mPas, up to 4,100 mPas, up to 4,000 mPas, up to 3,900 mPas, up to 3,800 mPas, up to 3,700 mPas, up to 3,600 mPas, up to 3,500 mPas, up to 3,400 mPas, up to 3,300 mPas, up to 3,200 mPas, up to 3,100 mPas, or up to 3,000 mPas. In some embodiments this viscosity changes directly after dissolution of the starch, after 2 h or 24 h storage and at a temperature of 20-25° C. Of course, the viscosity in the composition may vary owing to various additives. A purely aqueous solution is therefore used as a material property of the starch to determine the viscosity of the starch. In particularly preferred embodiments the glue composition also displays these viscosity values.

Owing to the use according to the invention of a branching enzyme, the degree of branching of the starch is increased. The degree of branching is ensured by means of NMR analysis. A general description for measuring degrees of branching of starch products is provided by Gunilla S. Nilsson, et al. (Starch/Stärke (1996) 48, No. 10. p. 352-357).

In preferred embodiments the degree of branching of alpha-1,6 branchings is between 4 and 12%. A degree of branching of at least 4%, at least 4.5%, at least 5%, at least 5.5%, at least 6%, at least 6.5%, at least 7%, or at least 7.5% is preferred in particular. In particular, the degree of branching of a starting starch is increased by the modification according to the invention, specifically preferably by at least 1%, in particular preferably at least 2%, at least 3%, at least 4%, at least 5%, or at least 6%. In particularly preferred embodiments all branchings are exclusively alpha-1,6 glycoside bonds.

The starting starch, that is to say the basis of the enzymatic modification according to the invention, may be any conventional tuber, cereal or leguminous starch, for example pea starch, maize starch, including waxy maize starch, potato starch, amaranth starch, rice starch, including waxy rice starch, wheat starch, including waxy wheat starch, barley starch, including waxy barley starch, manihot starch, or sago starch. Starches of natural origin generally have an amylose content of 20% to 30%, depending on the type of plant from which they are obtained. However, there are also starches which are rich in amylopectin and have a considerably increased amylopectin content, and products which have an increased amylose content. In addition to the types of amylopectin-rich starches and highamylose types obtained naturally or by cultivation measures, there are also amylopectin-rich starches which are obtained by chemical and/or physical fractioning or are prepared via genetically modified plants, these starches being obtained, inter alia, by suppressing amylose production. Amylopectin-rich cereal starches based on maize starch (waxy maize starch), rice starch, wheat starch and barley starch are known. Developments in the field of amylopectin-rich starches are embodied by amylopectin-rich potato starch and amylopectin-rich manihot starch. In particular, starches having a high amylopectin content are preferred, in particular starches containing at least 80%, in particular at least 85%, at least 88%, at least 90%, at least 92%, at least 94%, at least 95%, at least 96%, at least 97%, at least 98%, at least 99%, or at least 99.5% amylopectin. Amylopectin is already a branched starch and the enzymatic modification according to the invention using a branching enzyme may further increase this already naturally high branching. Waxy maize starch is particularly preferred.

Since starch is naturally heterogeneous, other starch molecules, in addition to the starch molecules in the range which is preferred in accordance with the invention and having the above-mentioned properties, may also be present in enzymatically branched starches prepared in accordance with the invention for the glue composition. In preferred embodiments the proportion of enzymatically modified starch, as defined above, is at least 50% (% by weight) of the starch of the composition. This proportion of this enzymatically modified starch us preferably at least 55%, at least 60%, at least 65%, at least 70%, at least 75%, at least 80%, or at least 85% of the starch composition.

The starch is modified by a branching enzyme, whereby the degree of branching compared to modified starch is increased and/or the polydispersity compared to unmodified starch is lowered. In particular, the branching enzyme is a 1,4-α-D-glucan: 1,4-α-D-glucan 6-α-D-(1,4-α-D-glucano) transferase (E.G. 2.4.1.18). Different branching enzymes are known in the prior art and are able to further increase starch by converting α1,4 glucoside bonds into α1,6 bonds. Branching enzymes are known from various sources, for example from potato, *Bacillus* sp., *Streptomyces* sp., *E. Coli, Pseudomonas* sp., yeasts such as *Candida, Kluyveromyces, Pichia, Saccharomyces, Schizosaccharomyces* or *Yarrowia*, fungi such as *Acremonium, Aspergillus, Aureobasidium, Cryptococcus, Filibasidium, Fusarium, Humicola, Magnaporthe, Mucor, Myceliophthora, Neocallimastix, Neurospora, Paecilomyces, Penicillium, Piromyces, Schizophyllum, Talaromyces, Thermoascus, Thielavia, Tolypocladium,* or *Trichoderma*. In particular, a branching enzyme from *Rhodothermus* sp., for example *Rhodothermus Obamensis* or *Rhodothermus Marinus* is preferred. By selecting suitable amounts of the branching enzyme or source, the starches branched in accordance with the invention can be prepared. The starch according to the invention may optionally be isolated as a fraction of a branching product after treatment of a starting starch with the branching enzyme. The use of a branching enzyme from *Rhodothermus* sp. Is particularly preferred. These enzymes have a specific catalytic property and a specific temperature optimum above 60° C., which enables economically viable production. Without being limited to a specific theory, it is assumed that other branching reactions also take place in the event of reaction above 60° C., and that the starches which are obtained by means of a branching enzyme of *Rhodothermus* sp. or another thermophilic organism containing a branching enzyme which has a temperature optimum of at least 60° C. also contain different starch products. These are particularly preferred for the present invention. The branching reaction is particularly preferably carried out at a temperature of at least 20° C., at least 30° C., at least 40° C., at least 50° C., at least 55° C., at least 60° C., at least 65° C., at least 70° C., at least 75° C., or at least 80° C. The branching reaction is preferably carried out on starch in the gel state or on agglutinated starch, in particular in aqueous solution. The starches obtainable in such a reaction can be used in a glue composition according to the invention.

The enzyme activity of enzymes is normally given in enzyme units E.U, or just U. In particular if the enzyme may also catalyze other reactions, the activity for a branching reaction is accordingly given in branching enzyme units (BEU). A method for measuring this specific enzyme activity was described by Takata et al. (Applied and Environmental microbiology (1994), vol. 60, no. 9, p. 3097). The corresponding "Assay A" is explained in detail in the Materials and Methods Section under the heading "Branching Enzyme activity". The assay is based on the action of the branching enzyme on a defined amylose type and the reduction in the absorption intensity of the amylose lod complex. Branching enzymes are preferably used in sufficient amount for an activity of 50 to 20,000 BEU per gram of starch used. In particular, activities of at least 80 BEU, at least 100 BEU, at least 120 BEU, at least 200 BEU, at least 250 BEU, at least 300 BEU, at least 400 BEU, at least 500 BEU, at least 600 BEU, at least 700 BEU, or at least 800 BEU per gram of starch are preferred. In other embodiments the activity is up to 1,500 BEU, up to 1,800 BEU, up to 2,000 BEU, up to 2,500 BEU, up to 3,000 BEU, up to 4,000 BEU, up to 5,000 BEU, up to 6,000 BEU up to 7,000 BEU, up to 8,000 BEU, up to 9,000 BEU, up to 10,000 BEU, up to 12,000 BEU, up to 14,000 BEU, up to 16,000 BEU, up to 18,000 BEU, or up to 20,000 BEU per gram of starch.

The starch according to the invention of the glue composition is normally substantially free from low-molecular oligosaccharides having a degree of polymerization of less than 3. The proportion of low-molecular oligosaccharides is preferably less than 5% by weight of the starch mass. In particularly preferred embodiments this proportion of low-molecular oligosaccharides may also be less than 4%, less than 3%, less than 2%, less than 1%, less than 0.5%, less than 0.1%, or less than 0.05%. A branching enzyme is preferably used which produces these low proportions of low-molecular oligosaccharides. Alternatively, if low-molecular oligosaccharides are present, these may be separated if necessary.

More specifically, it has been found in accordance with the invention that the enzymatically branched starch has a high level of solubility in water, and in particular the starches are at least 75% (% by weight), in specific embodiments at least 85%, particularly preferably at least 95% water-soluble at 25° C. In specific embodiments the starch is not modified further, apart from natural modifications, such as phosphate esterification, and the modification according to the invention by artificial branching. The starch preferably has acid groups, both in protonised and deprotonised form or in the form of a salt. Such groups may be selected for example from phosphate, phosphonate, sulphate, sulphonate or carboxylic acid groups, in particular preferably phosphate or carboxylic acid groups. The proportion of acid groups per starch molecule is preferably between 0.01 and 4, preferably 0.05 and 3 or 0.1 to 2.5, 0.5 to 2, 0.75 to 1.5, or 0.8 to 1.25.

In other embodiments the starch product enzymatically modified (branched) according to the invention may be modified physically or chemically, in particular by substitution of hydroxyl groups of the anhydroglucose units. Further enzymatic modifications are possible, even by enzymes other than the branching enzymes according to the invention, such as modification by amylases. The additional enzyme, physical or chemical modification may take place before, during or after the branching enzyme modification according to the invention. For example, "chemical modification" is understood to mean cross-linking, etherification and esterification for example. Other forms of chemical modification are also not to be excluded. Combinations of the aforementioned modifications also form part of the invention.

Crosslinking is preferably carried out by reaction with epichlorhydrin, di- or polyfunctional glycidyl ethers or esters (butanediol diglycidyl ether, polyglycerol triglycidyl ether, cyclohexane dimethanol diglycidyl ether, glycerol triglycidyl ether, neopentylglycol diglycidyl ether, pentaerythrite tetraglycidyl ether, trimethylolpropane triglycidyl ether, perhydrobisphenol diglycidyl ether), phosphoroxychloride or trimetaphosphate salts (sodium trimetaphosphate). The crosslinking may also take place, for example, with adipic acid, polyphosphates, 1,3-dichloro-2-propanol, optionally mixed with (poly)amines, also with di- or polyepoxides, di- or polyvalent isocyanates, linear dicarboxylic acid anhydrides, adipic acid, dichloroacetic acid, divinylsulphones, citric acid acrolein, acrolein polyphosphate, for example hexametaphosphate, biphenyls, N,N,-dimethylolimidzolidon-2 (DMEU), via an acetal cross-linking, for example with formaldehyde, dimethylol ethylene urea aldehydes or aldehyde-releasing reagents, such as N,N'-dimethylol-N,N'-ethylene urea and mixed anhydrides of carboxylic acids with di- or tribasic acids, such as a mixed anhydride formed from acetanhydride with adipic acid. The latter or numerous variants thereof may be combined under the expression "crosslinking with adipic acid". Other crosslinking agents known to a person skilled in the art are also considered as crosslinking reagents; the reagents given above are merely a selection of possible chemicals.

The enzymatically modified starch products obtainable by cross-linking at a molar ratio of cross-linking reagents (V) to anhydroglucose units (AGU) of at least 0.000001 to 1.0 can be pre-treated or post-treated. One kilogram of starch contains approximately 6.2 mol of anhydroglucose units.

Further chemical modifications are etherification or esterification, for example. Unless specified otherwise hereinafter, the substituents include organic radicals containing up to 20, preferably up to 15, in particular up to 10, more specifically up to 6 carbon atoms. Some derivatizations will be described hereinafter which may be provided alone or in combination with one another for further derivatization of the starch derivatives. The type of derivatization and the raw material base of the starch used (for example amylopectin-rich potato starch or amylopectin-rich maize starch) are associated very closely with the specific field of use of the respective product. The methods for this are known per se. More specifically, modification in slurry and paste is mentioned at this juncture, dry derivatizations and modification also being possible by extrusion methods.

Large number of derivatives are known from the literature, the production of which is well summarized, inter alia, in the work "Starch: Chemistry and Technology", R. L. Whistler, Chapters X and XVII, 1984, and in "Modified Starches: Properties and Uses", published by O. B. Wurzburg, Chapters 2-6, and 9-11, CRC Press, 1986. Generally, in the case of starch derivatives a distinction is made between starch ether and starch ester. Furthermore, it is possible to differentiate between non-ionic, anionic, cationic, amphoteric and hydrophobic starch derivatives, which can be prepared via a slurry, paste, half-dry or dry derivatization, or via a derivatization in organic solvents.

Anionic and non-ionic modification of the starch include any derivatives in which the free hydroxyl groups of the starch are substituted by anionic or non-ionic groupings.

The anionic and non-ionic derivatization can be carried out, in principle, in two ways:

a) the modification is carried out in such a way that it leads to an esterification of the starch. Inorganic or organic acids or salts thereof of different values, generally divalent acids or salts thereof, esters thereof or anhydrides thereof are used as modification agents. The following acids (the listing of which is merely exemplary) are thus suitable, inter alia: o-phosphoric acid, m-phosphoric acid, polyphosphoric acid, a wide range of sulphuric acids, a wide range of silicic acids, a wide range of boric acids, acetic acid, oxalic acid, succinic acid and derivatives thereof, glutaric acid, adipic acid, phthalic acid, citric acid, etc. Mixed esters or anhydrides may also be used. This may also occur repeatedly during the esterification of the starch, and therefore di-starch phosphoric acid esters may thus be produced for example. The starch used in accordance with the invention is preferably the product of esterification with mono-, di- or tricarboxylic acids having an alkyl chain containing 1 to 30 carbon atoms or a carbamate, particularly preferably acylated, for example succinylated, octenylsuccinylated, dodecylsuccinylated or acetylated.

b) the modification is carried out in such a way that it leads to an etherification of the starch. It is particularly preferred if the starch used in accordance with the invention is a methyl, ethyl, hydroxyethyl, hydroxypropyl, hydroxybutyl, carboxymethyl, cyanoethyl, or carbamoylethyl ether starch or a mixture thereof.

The starch is thus substituted, primarily or additionally, with phosphate, phosphonate, sulphate, sulphonate or carboxyl groups for example. This is achieved, for example, by reacting the starch with halocarboxylic acids, chlorohydroxyalkyl sulphonates or chlorohydroxyalkyl phosphonates.

Cationic modification of the starches includes any derivatives where a positive charge is introduced into the starch by substitution. The cationizing methods are carried out with amino, imino, ammonium, sulphonium or phosphonium groups. Methods for producing cationized starches are described, for example, by D. B. Solareck: Cationic Starches, the book by O. B. Wurzburg (Hrsg.): Modified Starches Properties and Uses, CRC Press Inc., Boca Raton, Fla. (1986), p. 113-130. Such cationic derivatives preferably contain nitrogen-containing groups, in particular primary, secondary, tertiary and quaternary amines or sulphonium and phosphonium groups which are bound via ether or ester bonds. The use of cationised starches which contain tertiary and electropositively charged quaternary ammonium groups is preferred.

A further group is formed by amphoteric starches. These contain both anionic and cationic groups, thus rendering their possibilities for use very specific. Cationic starches are generally involved which are additionally modified either by phosphate groups or by xanthates. An illustration of the preparation of such products is also described by D. B. Solareck: Cationic Starches, the book by O. B. Wurzburg (Hrsg.): Modified Starches: Properties and Uses, CRC Press Inc., Boca Raton, Fla. (1986), p. 113-130.

In the case of esters, a distinction is made between single esters and mixed starch esters, wherein the substituent(s) of the ester may be different: in the ester radical RCOO—, the radical R may be an alkyl, aryl, alkenyl, alkaryl or aralkyl radical containing 1 to 20 carbon atoms, preferably 1 to 17 carbon atoms, preferably containing 1 to 6 carbon atoms. These products include the derivatives acetate (prepared from vinyl acetate or acetanhydride), propionate, butyrate, stearate, phthalate, succinate, oleate, maleinate, fumarate and benzoate.

Etherifications occur largely by reaction with alkylene oxides (hydroxyalkylation), which contain 1 to 20 carbon atoms, preferably 2 to 6 carbon atoms, in particular 2 to 4 carbon atoms, in particular by use of ethylene and propylene oxide. However, methyl, carboxymethyl, cyanethyl and carbamoylether may also be prepared and used. As an example of carboxyalkylation, the reaction is headed by starch with monochloroacetic acid or salts thereof. Hydrophobing etherification reagents, such as glycidyl ethers or epoxides are also specifically named. The alkyl chain length of the mentioned reagents is between 1 to 20 carbon atoms, but aromatic glycidyl ethers are also possible.

O-cresol glycidyl ether, polypropylene diglycol glycidyl ether, tert-butylphenyl glycidyl ether, ethylhexyl glycidyl ether, hexane diol glycidyl ether and neodecanoic acid glycidyl ester are also examples of a derivatization with glycidyl ethers.

A further option for alkylation lies in alkylation via alkylhalogenides, for example via methylchloride, or dialkyl carbonates, for example dimethyl carbonate (DMC) or dialkyl sulphate, for example dimethyl sulphate.

The degree of substitution MS (molar substitution: mol substituent/mol glucose unit) is preferably at least 0.0001, 0.001, 0.01, 0.02, 0.03, 0.04, or at least 0.05, 0.06, 0.07, 0.08, or 0.09, most preferably at least 0.1, and up to 3.0, 2.0, 1.0, 0.8, 0.75, 0.7 or up to 0.6. The degree of substitution DS (mol substituent (directly bound to the glucose unit)/mol glucose unit) is preferably between 0.001 and 3.0, preferably between 0.05 and 0.5.

In addition to the ethers and/or esters and additionally to the derivatization thereof, the cross-linked starch used in accordance with the invention may also be oxidized, thermochemically degraded, dextrinated or extruded to varying degrees.

The starches used for esterification, etherification and cross-linking, and also the chemically unmodified starches may also be tempered (in slurry) via thermal-physical modifications or inhibited (dry or half-dry reaction).

Starches may also be modified via hydrophobing reagents. Etherified hydrophobic starches are obtained if the hydrophobic reagents contain a halogenide, an epoxide, a glycidyl, a halohydrin, a carboxylic acid or a quaternary ammonium group as a functional group. For esterified hydrophobic starches, the hydrophobic reagent generally contains an anhydride. The reactions conducted may also take place in the presence of a surfactant. A hydrophobing of the starch may also take place via mixing of a starch or a starch derivative with fatty acid ester. In accordance with the invention, the starch derivative is hydrophobed, in particular with a degree of derivatization of the hydrophobing as given above with regard to substitution, preferably between MS of 0.01 to 0.1. All the modifications of the starch mentioned can be achieved not only by reacting native starches, but degraded forms may also be used. The degradation processes may take place in a mechanical, thermal, thermochemical or enzymatic manner. The starch may thus not only be altered in terms of structure, but the starch products may also be made to be soluble in cold water or swellable in cold water (for example dextrination and extrusion).

Lastly, the starch may also be present as a graft polymer or as a graft copolymer, for example with products from the group of polyvinyl alcohols, acrylamides or monomers, or polymers starting from hydrocarbons. The starch graft (co)polymer may preferably be present as an emulsion polymer.

A specific advantage of the glue composition according to the invention is that the composition may be provided so as to be stable in liquid or aqueous form. In particular, the glue composition has a long-term stability after dissolution in water of at least 5 days, at least 10 days, at least 15, at least 20 days or at least 1 month, at least 2 months, at least 3 months, at least 4 months, at least 5 months, at least 6 months, at least 7 months, or at least 8 months, without retrogradation. Retrogradation may be determined, for example by the increase in viscosity until formation of a solid gel. The long-term stability may be parameterized, for example, via the viscosity stability index (SI), which expresses the subsequent thickening behavior over a specific period in the form of the quotient of viscosity after 14 days for example (or the above-mentioned periods), and the viscosity after preparation of the composition (mostly 2 h thereafter, temperature control at 22.5° C.).

According to particularly preferred embodiments, the present invention relates to a glue composition, wherein the starch has a viscosity stability index SI of less than or equal to 1.3, preferably of less than or equal to 1.2, especially preferably of less than or equal to 1.2, in particular calculated by the quotient of viscosity after 14 days and by the viscosity after 2 hours following preparation of the composition.

A parameter for assessing stability is the viscosity stability index or stability index for short (SI value), which can be used as a measure for the subsequent thickening behavior. This value should be as low as possible in a stable composition. The SI value used herein is the quotient from the viscosity (for example a 40% or 50% solution of the starch according to the invention in water) after 14 days and 2 h. Values around 1 demonstrate good viscosity stability, and the higher the value, the greater the subsequent thickening. A starch according to the invention has an ND value, in 50% (% by weight) solution in water, of less than 3, preferably less than 2, less than 1.8, less than 1.7, less than 1.6, less than 1.5, less than 1.4, less than 1.3, less than 1.2, or less than 1.1. In further preferred embodiments of the starch according to the invention, these low SI values are given alternatively or additionally in 40% (% by weight) solution, in particular in the case of starches with a higher molecular weight, such as from 150 kDa or else from 200 kDa weight average Mw, measured by light scattering. More specifically, the viscosity is calculated directly after dissolution of the starch, after 2 h or 24 h storage and at a temperature of 20 to 25° C. of the product solution, in particular at 22.5° C. Of course, the viscosity stability in the composition may vary owing to different additives. A purely aqueous solution is thus used as a material property of the starch to determine the viscosity of the starch. In particularly preferred embodiments the glue composition or the entire starch fraction thereof displays these viscosity stability values.

In a further aspect, the present invention relates to a starch-based glue composition containing an enzymatically branched starch obtainable by contacting a starting starch with a branching enzyme, preferably formed of *Rhodothermus* sp., in particular *Rhodothermus Obamensis* or *Rhodothermus Marinus*, with an activity of 50 BEU to 20,000 BEU, preferably from 80 BEU to 10,000 BEU, especially preferably 100 to 5,00 BEU, most preferably 250 to 2,500 BEU, or from 275 BEU to 1,800 BEU per gram of starting starch. Alternative branching enzymes are obtainable from the above-mentioned sources. As already mentioned above, a branching with a branching enzyme from *Rhodothermus* sp. with the above-mentioned activities led to especially preferred starches which have particularly strong bond strength, are low-viscous and have an extraordinarily high long-term stability in liquid or aqueous form. Starches of this embodiment of the present invention are preferably defined further, as already described generally above, in terms of the (mean) molar masses Mn and Mw, polydispersity indices, starting starch, DE values, solubility and low proportion of low-molecular oligosaccharides.

In a further embodiment the present invention also relates to the use of the glue composition according to the invention for lamination or as a glue, in particular as a glue for paper or cardboard products, in particular preferably for the lamination of a display cardboard. Lamination is understood to mean the bonding of identical or different materials using suitable laminating agents under pressure and, if necessary, temperature. If liquid glues (dispersions, etc.) are used as laminating agents a distinction is made between wet and activated lamination. With wet lamination the glue film in the glued joint still contains considerable proportions of water or solvent. Activated lamination means that the dry gluing layer is mostly gluable by heat.

"Use as a glue" and "gluing method" with use of the starch according to the invention are treated herein as meaning the same thing. It has been found that the glue compositions according to the invention based on the enzymatically modified starches demonstrate excellent spreadability, long-term viscosity, stability and bond strength, it having been additionally found, surprisingly, that paper products only swell slightly, or do not swell at all. This enables a use for flat paper surfaces without warping it, which is a prerequisite for use for display cardboard, where a printed or printable surface must be protected against warping during gluing or drying.

In further embodiments the glue is provided as a cigarette glue, wateractivatable glues, in particular for labels or stamps, glue for all-over gluing or overlap gluing, wallpaper glue, poster glue, book binder glue, corrugated board glue, label glue, bag glue, sleeve glue, hot-melt glue, for example for sealing cardboard, for paper cups and paper bag gluing, for the production of folding boxes, as glue for paper and cardboard lamination, as glue for hygiene articles, for example for toilet paper and/or rolls or pocket tissues, or as glue for medicinal products, for example medicinal paper, cellulose or textiles products such as bandages, as glue for textiles made of woven and non-woven fibers, plastics materials and films, glass, wood and wood composites, ceramics, metal, etc. In specific embodiments the glue composition according to the invention is provided as glue for ceramics or ceramic particles, in particular for the production of abrasive paper.

In a further aspect, the invention relates to a glued product containing a glue composition as an adhesion promoter. Such a product may, for example, be a paper or cardboard product having at least one layer, preferably two layers containing or made from paper or cardboard, however it may also be formed of any combination of the following substrates: textiles made of woven and non-woven fibers, plastics materials and films, glass, wood and wood composites, ceramics, metal, etc. The glued product normally contains two sides which have been glued together as well as one or two layers of paper or cardboard which are bonded by the glue according to the invention, in particular wherein one layer has a printed or printable flat surface, in particular on a side of the layer opposite the side to glued. Logically, the display surface itself is not glued.

In a further aspect the invention relates to a method for gluing (gluing method) a product, containing the application of the glue composition according to the present invention to a side to be glued of the product. This may take place by roller application, nozzle application, spray application, foam application, via anilox application rolls, by a dipping method, by doctoring, etc. A further side to be glued is then fixed on the applied glue to form a rigid bond (after setting or drying of the glue).

In a further aspect, the present invention relates to a method for preparing the starch of a glue composition as described above by enzymatic modification containing contacting a starting starch with a branching enzyme, preferably of Rhodothermus sp., in an amount having an activity of 50 BEU to 20,000 BEU, preferably, as described above for example, at least 80 BEU to 10,000 BEU or 90 BEU to 5,000 BEU per gram of the starting starch. Preparation is possible both with continuous and batch-wise methods.

In an additional aspect the invention also relates to a method for enzymatic modification of starch, characterized in that the starch is contacted with a branching enzyme, preferably of Rhodothermus sp., and in that the mean molar mass of the desired modified starch product is controlled by the starting amount of enzyme per starting starch (amount by weight). In accordance with the invention it has quite surprisingly been found that a wide range of starch products can be obtained as a result of the amount of branching enzyme used. For example, a highly branched starch product with relatively low molar mass is thus obtained by a high starting amount of branching enzyme. If lower amounts of branching enzyme are used then higher molecular starch products are obtained. The starches obtained have their own characteristics depending on the control by the starting amount of enzyme per starting strength. The ranges in which a branching enzyme is used in accordance with the invention is preferably between 50 BEU (low activity) and 20,000 BEU (high activity). Of course, lower or higher activities are also possible, but it was found that the particularly advantageous properties, namely the high long-term stability, low viscosity and extraordinarily high bond strength can be obtained within the range of 50 BEU and 20,000 BEU. The starting amount of enzyme per starting starch (amount by weight) can be selected according to the desired molar mass of the starch product produced.

The glue compositions according to the invention may further contain conventional admixtures or fillers, additives, salts, buffer components or biocides. Such additives or fillers may be used in particular to finely adjust viscosity, solid content, stability, bond strength, rheology, drying rate, flexibility, water-resistance and fungal-resistance.

Fillers include: kaoline, silicates, calcium carbonate, chalk, talc, magnesium carbonate, microsilica, fibers, etc.

Rheology-modifying additives include: influence shear-thinning and shear-thickening: inorganic colloids, peptisers, silicates, urea, xanthan, casein, alginate, cellulose ether, carrageen, guar gum, hydrocolloids, water glass.

Dispersants include: polyacrylates, hydrophobed polyacrylates, etc.

Preservatives (fungicides, biocides, bacteriocides) include: BIT, MIT, CIT, sorbates, etc.

Foam-forming additives include: in particular for gluing by means of foam application methods include: surface-active products ("surfactants"): anionic, cationic, non-ionic, amphoteric, such as alkylsulphonates, modified quaternary ammonium salts, ethoxylates, etc.

Moisture-regulating products and plasticizers include: sodium nitrate, urea, sugar, sugar alcohols, glucose, sorbitol, polyvalent alcohols, (glycols, etc.), calcium chloride, zinc chloride.

Dyes and pigments include: titanium dioxide, etc.

Anti-static additives.

Tackifiers include: acrylate, dextrin, resins.

Cross-linkers include: boric acids (Borax), zirconium salts, etc.

Wet strengtheners and surfactants.

Polyvinyl acetate, polyvinyl alcohol, dispersion powder, etc.

Other items include: water glass, waxes, salts, antioxidants, aromas, defoaming agents and other additives which are typically used in this instance.

The starch according to the invention may also be used as an additive in conventional glues, in particular in water-based glues or in glues containing an aqueous solvent. A specific example of this is water-glass-based glues. The starch according to the invention may act as an additional glue component in order to additionally increase the bond strength of conventional glues. Such glues may also contain the above-mentioned additives or fillers and may be used for the purposes according to the invention.

In a further aspect of the present invention, the present invention relates to a process for preparing a glue composition, containing the enzymatic modification of a starch and optional mixing with an aqueous solvent and optionally the above-mentioned fillers, additives, salts and buffer components, in particular such as acids or bases to set a desired pH value. The composition may be provided in liquid, in particular aqueous form, or as a solid, for example as a powder, or even as a glue precursor. The starch is preferably provided from 1 to 80% (% by weight in liquid solution, in particular preferably 10 to 70%, or 20 to 65%, most preferably 25 to 60%. Glue precursors can be processed by stirring with water to form end glues. In a specific embodiment the glue formulation is to be used as a replacement of synthetic polyvinyl-alcohol-based and/or polyvinylacetate-based glues.

A composition according to the invention for use may optionally also contain low amounts of starch from 1% (% by weight) in liquid form in solution. The starch proportion in the composition is preferably at least 5%, at least 10%, at least 15%, at least 20%, at least 25%, at least 30%, at least 35%, at least 40%, or at least 45%. In a further aspect, the present invention relates to a concentrated composition which is stable in the long-term (for example as concentrated stock solution) of at least 40%, at least 50%, at least 55%, at least 60%, at least 65%, or else at least 70%. These concentrated solutions may also be used either directly for gluing or lamination, or may be diluted for use. The starch and glue composition according to the invention may also be provided in solid or semi-solid form, in particular as a glue stick. These forms may also be provided for immediate use. In addition to the starch, small amounts of solvent, in particular aqueous solvents, may also be present in glue sticks so that a spreadable viscous composition is obtained. Glue sticks and also the compositions of the invention which are generally based on the starch according to the invention also afford the advantage, in addition to the high bond strength, that they are toxicologically safe and are also adapted for use by children.

Other features which are considered as characteristic for the invention are set forth in the appended claims.

Although the invention is illustrated and described herein as embodied in a starch-based glue composition, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Example 1

Preparation of a Highly-Branched Starch (Ems3)

Materials:
a. waxy maize starch Maisita 21.007;
b. branching enzyme NS28067, (activity of 50,000 BEU/g solution);
c. sodium hydroxide solution;
d. hydrochloric acid; and
e. filtering aid.

100 g of waxy maize starch (dry substance) were mixed in with distilled water to form a 10% slurry. This slurry was gelatinized (95° C.) with constant stirring (propeller stirrer). The starch began to gelatinized from a temperature of approximately 70 to 75° C. The temperature of 95° C. was maintained for 1 hour to ensure complete starch digestion. After cooling to 75° C., the pH value of the paste was set to pH 6 (0.1 N hydrochloric acid or 0.1 N sodium hydroxide solution). The enzyme was then added (1,000 BEU/g of starch). In order to obtain other products, 20 BEU/g to 1,000,000 BEU/g were alternatively used. The moment of enzyme addition is defined as the start of the reaction. The initial relatively thick paste became gradually runny after addition of the enzyme. The reaction mixture was held constantly at a temperature of 75° C. and the reaction was terminated after 20 hours. For this purpose, the mixture was brought approximately to pH 3 using hydrochloric acid and was boiled for 30 mins. This raw product was then purified by filtration and dried, the dried product was ground. A liquid starch was produced from part of the purified raw product. This occurs by evaporating water until reaching the desired product concentration.

Example 2

Preparation of the Paste

Distilled water (250 g) was introduced into a 400 ml beaker glass (high type) and, for 40%, 100 g in dry substance (i.DS) were weighed in, and for 50% 125 g starch i.DS were weighed in. Stirring occurred using a Heidolph stirrer and a toothed-disc stirrer (diameter 4 cm). The sample was interspersed quickly, without clump formation where possible, at 1000 rpm and stirred for 10 min. In order to ensure the biological stability of the glues prepared, each glue was mixed with 1% biocide solution based on the starch.

The first viscosity measurements were taken directly after the stirringin process. The glues were then filled into screw-cap jars for storage and stored at constant temperature.

Example 3

Determination of Viscosity

The starch pastes prepared by the above-described method or a liquid starch may be used directly to determine viscosity. Viscosity was calculated with the aid of a Brookfield-RV viscosimeter (DVII+Viscosimeter) at 22.5° C. and at a rotational speed of 100 rpm of spindle 4.

The first measurement was taken directly after preparation of the paste, further measurements being taken after 2 hr, 24 hr, 7 days and 14 days to assess viscosity stability. For this purpose, the stability index value (SI) was used, that is to say the quotient from viscosity after 14 days and 2 hr. Values around 1 demonstrate good viscosity stability: the higher the value, the more pronounced the subsequent thickening. Set samples were given with an SI value greater than 10.

Example 4

Determination of Bond Strength

A hand-held doctor blade was placed on the outer face of a bag paper (SE BL 90 g/m$^2$) with the desired layer thickness (30, 60 or 120 μm), filled with paste (preparation see above) and drawn over the paper. Thereupon, a second paper strip was placed on via its inner paper face. The combined paper was smoothed using the palm of a hand and then smoothed again in a similar manner on the rear face. The bonded paper strips were now slowly drawn away from one another bit by bit by hand (slightly jerkily) until a complete fiber tear (over the entire width of the bond) was established. This period of time is the bonding speed and is given in seconds, wherein a mean value from at least 3 measurements was provided. If, after 150 seconds, still no bonding could be established, the measurement was terminated.

Example 5

Determination of the Molar Mass Distribution

Molar mass distribution was determined by size-exclusion chromatography (SEC, UltiMate 3000, Dionex), in which the molecules are separated in accordance with their hydrodynamic volume over the corresponding column system (Suprema 30.000 Å+1000 Å+100 Å; 20 μm particle size; PSS Mainz).

The scattered light intensity is also proportional to the molar mass in addition to concentration and breaking increment dn/dc. The molar masses (number average Mn and weight average Mw) at the known dn/dc can thus be determined by the combination of a MALLS detector (Multi Angle Laser Light Scattering, measures the scattered light intensity at a number of angles; SLD7000, PSS Mainz) and an RI detector (Refractive Index, determines the concentration, RI-101, Shodex). The polydispersity (breadth of the distribution, PDI=Mw/Mn) and the average degree of polymerization (DPn=Mn/162) were calculated from these values.

For conventional SEC, the system was calibrated using a Pullulan standard set (180-788000 g/mol, Polymer Laboratories).

For digestion, starch was stirred at 2.5% into deionized water and brought to a pH level of pH 7 using hydrochloric acid (1N) or NaOH solution (1N). This aqueous solution was diluted with DMSO at a ratio of 1:1.5 and digested with stirring for 30 min at 100° C. The solution obtained must be homogeneously clear. After cooling, the samples were filtered over a glass fiber filter and are then ready for measurement.

The following HPLC parameters were used for the measurement:
eluent: 0.2 M NaNO$_3$ solution (with 0.2 mg NaN3)
flow: 0.7 ml/min
injection volume: 80 μl
column temp.: 70° C.
running time: 70 min.

Example 6

Determination of the Degree of Branching

In order to determine the degree of branching by means of 1H-NMR spectroscopy, the samples were dissolved in D20 with 1% NaOH and measured at 70° C. In order to determine the degree of branching, the signals were required at 5.6 ppm (1) and 5.3 ppm (2) (solvent D20). Integration occurred via a previous base-line correction. The ratio in percent was calculated as follows:

[integral(2)*100]/[integral(1)+(2)]

The measurements were taken using a Bruker ARX 250 (Bruker ARX 250, 250 MHz 1H-NMR, solvent D20, 70° C.).

Example 7

Preparation of Glue for Gluing Display Cardboard

Formulation: Preparation of Glue for a Roller Application System:

20 kg 50% liquid starch or stirred-in starch paste of EMS3,
10 kg of a kaoline suspension (FSG=68%),
150 g biocide (for example petrocide), and
400 g 2% sodium hydroxide solution.

The liquid starch was introduced into a container, a kaoline suspension was added, with stirring, and the mixture was stirred for 30 min. The pH value was brought to 9 using sodium hydroxide solution and, for the purposes of storage, a biocide was stirred in.

The glue obtained had the following specifications:
solid content: 56%,
Brookfield viscosity at 25° C. after 24 h: 3650 mPas,
pH value: 9.0, and
bond strength on cardboard (60 μm hand-held doctor blade): 24 sec.

The laminating glue thus prepared has the following technical properties:
1. Excellent adhesion
2. High bond strength
3. Low tendency to spatter
4. High initial tack
5. "Ready to use" glue with excellent viscosity stability
6. Optimal gluing at the edges
7. No drawbacks during subsequent punching
8. Very good shear strength.

The following table shows the comparison of the different glues based on different raw materials:

|  | Dispersion glue | Maltodextrin glue | EMS glue |
|---|---|---|---|
| Solid content [%] | 55 | 55 | 56 |
| Viscosity [mPas]* | 2300 | Too thick, gelled | 1650 |
| Bond strength [s]** | 26 | — | 24 |

*Brookfield viscosity at room temperature after 24 h
**Bond strength on cardboard (60 μm hand-held doctor blade)

Example 8

Figure 4:
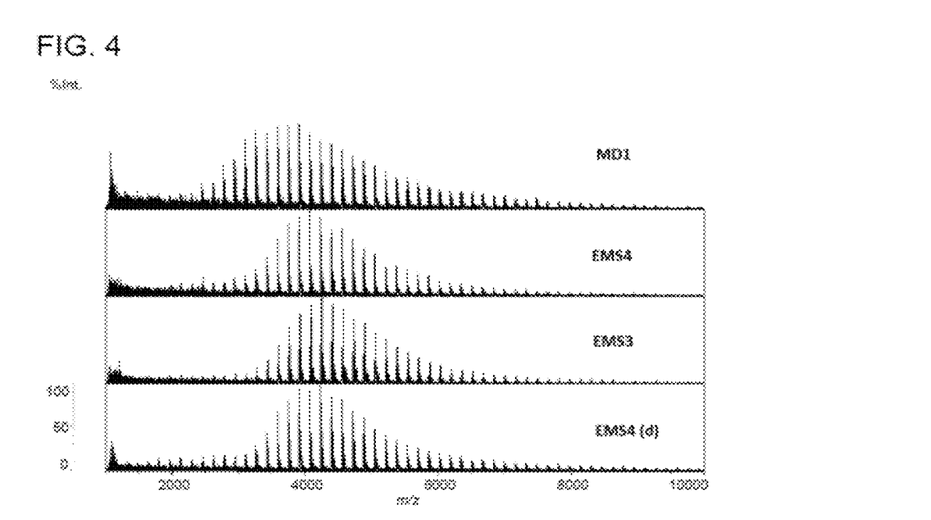
FIG. 4 is a graph showing a mass spectra of the starches after glucoamylase degradation (starches shown: MD1, EMS3, EMS4; EMS4(d) corresponds to the starch EMS4, the product of which was purified further by dialysis).

Calculation of the Glucoamylase-Resistant Proportion by Enzymatic Degradation with Glucoamylase The glycoamylase-resistant proportion was prepared as follows:

Glucoamylase was weighed in (final concentration 10 units/ml=1.3 mg/5 ml) and taken up in 5 ml of water (deionised). 100 mg of starch were added and the enzyme reaction was carried out for 16 h at 40° C. (with stirring in the digestion block). The reaction was stopped by heat treatment for 10 min at 100° C. (in a water bath). Undissolved parts were centrifuged off (10 min, 1500 rpm), wherein the liquid was processed further and the precipitate was discarded. 10 times the amount of ethanol was added, in portions, to the liquid. After centrifugation (30 min, 4000 rpm), the liquid was discarded. The precipitate was left to dry and then taken up in 1 ml of water (deionized). Glucoamylase was added again (final concentration 50 units/ml). The second reaction took place for 1 h at 40° C. A heat treatment was then carried out for 10 min at 100° C. (in a water bath). Undissolved parts were centrifuged off (10 min, 1500 rpm). The precipitate was discarded and the liquid was processed further. 10 times the amount of ethanol was added, in portions, to the liquid and the liquid was discarded after centrifugation (30 min, 4000 rpm). This end product was called a glucoamylase-resistant fraction. A product degraded in accordance with the invention ("EMS4 (d)") was additionally purified by dialysis before the glucoamylase treatment. Compared to conventional starches (maltodextrin with DE6; also degraded by glucoamylase), an analysis was carried out by means of MALDI-TOF (matrix: trihydroxyacetophenone). The measurement by mass spectrometry was carried out on an Axima TOF2, Shimadzu Biotech Kratos Analytical, Manchester, UK with calibration with single- and double-protonated bovine insulin (+/−1 Da). The results of the measurement in the positive ion mode are shown in FIG. 4 and Table 9.

Example 9

Results

The following starch properties and parameters were ascertained on the basis of the above-described methods:

TABLE 1

Starch comparative products:

| Abbreviation | Description | Raw material |
|---|---|---|
| MD1 | Maltodextrin DE6 | Waxy maize starch |
| MD2 | Maltodextrin DE15 | Maize starch |
| RD1 | Roast dextrin | Potato starch |
| EMS1 | Modification with 20 BEU/g starch | Waxy maize starch |

TABLE 1-continued

Starch comparative products:

| Abbreviation | Description | Raw material |
|---|---|---|
| EMS2 | Modification with 100 BEU/g starch | Waxy maize starch |
| EMS3 | Modification with 1,000 BEU/g starch | Waxy maize starch |
| EMS4 | Modification with 10,000 BEU/g starch | Waxy maize starch |
| EMS5 | Modification with 100,000 BEU/g starch | Waxy maize starch |
| WMS | Native waxy maize starch | Waxy maize starch |

MD1, MD2, RD1 and WMS are unmodified comparative examples within the scope of the invention. In accordance with the invention, enzymatically modified starches (EMS1-5) were modified in this case with branching enzyme of *Rhodothermus obamensis*. As shown below, different products were obtained depending on the amount of enzyme used. An extension of the reaction time led to no further change to the molar mass. Of course, less modified starches may also be obtained by stopping the reaction sooner. Particularly high bond strength and/or extraordinary long-term stability were demonstrated in particular in samples EMS2, EMS3 and EMS4.

TABLE 2

Calculation of the mean molar masses, polydispersity and average degree of polymerization of the starches via conventional SEC:

|  | Mw | Mn | PDI | DPn | DPw |
|---|---|---|---|---|---|
| MD 1 | 27000 | 2900 | 9.3 | 18 | 167 |
| MD 2 | 4700 | 1500 | 3.1 | 9 | 29 |
| RD 1 | 7660 | 24 | 3.2 | 15 | 47 |
| EMS 1 | 1200000 | 64000 | 18.8 | 395 | 7407 |
| EMS 2 | 87000 | 19000 | 4.6 | 117 | 537 |
| EMS 3 | 43000 | 13400 | 3.2 | 83 | 265 |
| EMS 4 | 31000 | 14700 | 2.1 | 91 | 191 |
| EMS 5 | 18500 | 8100 | 2.3 | 50 | 114 |

Mw: mean molar mass (weight average); Mn: mean molar mass (number average); PDI: polydispersion index (Mw:Mn); Dpn degree of polymerization according to the number average; Dpw degree of polymerization according to the weight average;

TABLE 3

Calculation of the mean molar masses, polydispersity and average degree of polymerization of the starches via light scattering:

|  | Mw | Mn | PDI | DPn | DPw |
|---|---|---|---|---|---|
| MD 1 | 61200 | 1800 | 34 | 11 | 378 |
| MD 2 | 6200 | 2700 | 2.3 | 17 | 38 |
| RD 1 | 8700 | 4500 | 1.9 | 28 | 54 |
| EMS 1 | 5506000 | 719000 | 7.7 | 4438 | 33988 |
| EMS 2 | 234000 | 66500 | 3.5 | 410 | 1444 |
| EMS 3 | 104000 | 67000 | 1.6 | 414 | 642 |
| EMS 4 | 90700 | 54000 | 1.7 | 333 | 560 |
| EMS 5 | 35000 | 19700 | 1.8 | 122 | 216 |
| WMS | >50000000 | >5000000 | approx. 10 | >38000 | >300000 |

Figure 1:
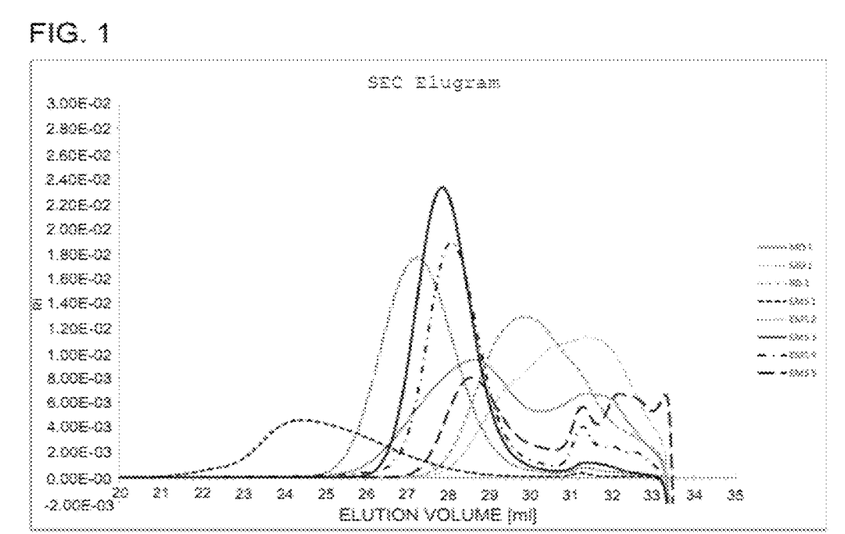
FIG. 1 is a graph showing elugrams of different starches: preferred starch in accordance with the invention after branching and commercial reference products (starches shown in accordance with Table 1: MD1, MD2, RD1, EMS1-5)
Figure 2:
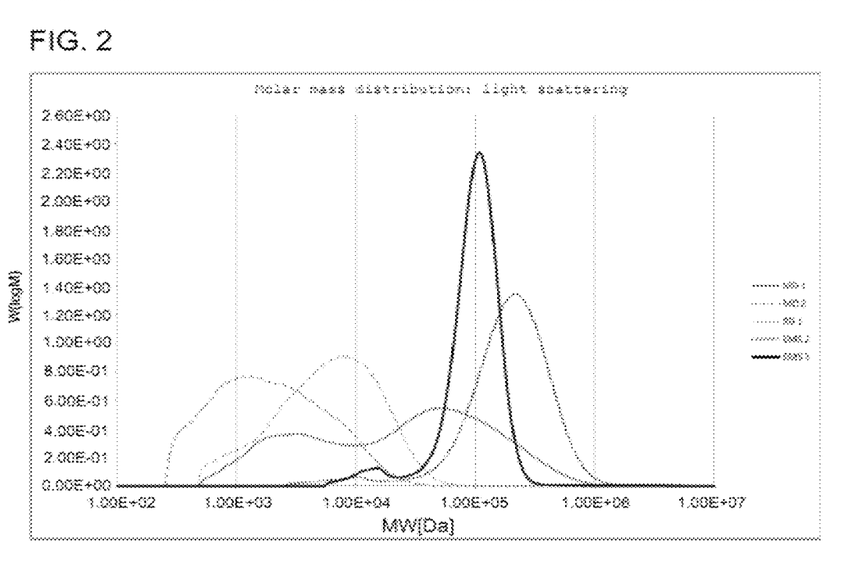
FIG. 2 is a graph showing a molar mass distribution of some starches in accordance with calculation by light scattering (starches shown: MD1, MD2, RD1, EMS2, EMS3)

Tables 2 and 3 show the shift of the mean molar mass of the starch molecules and the differences depending on measurement method. SEC elugrams and the molar mass distribution by light scattering measurement are also shown in FIGS. 1 and 2. The homogeneous composition of the EMS according to the invention can be clearly seen from this data and yields a narrow, dominant peak.

TABLE 4

Oligosaccharide proportion of the starch:

| | Glucose [%] | Maltose [%] | Maltotriose [%] | Maltotetraose [%] | Maltopentaose (%) | Maltohexaose (%) |
|---|---|---|---|---|---|---|
| MD1 | 0.05 | 1.4 | 2.2 | 1.7 | 1.3 | 1.3 |
| MD2 | 2.9 | 3.3 | 3.8 | 3.8 | 2.8 | 1.8 |
| RD1 | 0 | 0.1 | 1.4 | 1.3 | 0 | 0 |
| EMS1 | 0 | 0.1 | <0.1 | <0.1 | 0 | 0 |
| EMS2 | 0 | 0.1 | <0.1 | <0.1 | 0 | 0 |
| EMS3 | 0.1 | 0.5 | <0.1 | <0.1 | 0 | 0 |
| EMS4 | 0.0 | 1.1 | 0.8 | 0.5 | 0.4 | 0.4 |
| EMS5 | 0 | 0 | 2 | 0.9 | 0.9 | 0.3 |
| WMS | | | 0 | 0 | 0 | 0 |

Table 4 shows that hardly any low-molecular oligosaccharides accumulate in the case of enzymatic modification according to the invention of the starting starch.

TABLE 5

Product parameters: DE value and degree of branching:

| | DE value | Degree of branching NMR [%] |
|---|---|---|
| MD1 | 6.4 | 5.1 |
| MD2 | 13.7 | 6.1 |
| RD1 | 6.6 | ~7 |
| EMS1 | <0.1 | 4.4 |
| EMS2 | <0.1 | 5.2 |
| EMS3 | <0.1 | 7 to 8 |
| EMS4 | <0.1 | 10.9 |
| EMS5 | <0.1 | 12 |
| WMS | <0.1 | 4.3 |

According to Table 5, the increasing branching is demonstrated by the enzymatic modification while the DE value remains low. These parameters show a considerable structural difference to conventional industrial starches.

TABLE 8a

Calculation of viscosity and bond strength:

| | BF viscosity 40% 100 rpm | | | Bond strength 40% | | |
|---|---|---|---|---|---|---|
| | 2 h | 14 d | SI | 30 μm | 60 μm | 120 μm |
| MD1 | 148 | 356 | 2.4 | 58 | 57 | 101 |
| MD2 | 66 | 66 | 1.0 | | No bonding | |
| RD1 | 641 | 655 | 1 | 100 | 105 | >150 |
| EMS1 | 8300 | n.m. | >10 | 14 | 16 | 41 |
| EMS2 | 1048 | 812 | 0.8 | 24 | 33 | 67 |
| EMS3 | 338 | 369 | 1.1 | 45 | 44 | 94 |
| EMS4 | n.d. | n.d. | n.d. | n.d. | n.d. | n.d. |
| EMS5 | n.d. | n.d. | n.d. | n.d. | n.d. | n.d. | n.d.—not determined owing to insufficient amount of material
n.m.—not measurable owing to excessively high viscosity TABLE 8b Calculation of viscosity and bond strength:

| | BF viscosity 50% 100 rpm | | | Bond strength 50% | | |
|---|---|---|---|---|---|---|
| | 2 h | 14 d | SI | 30 μm | 60 μm | 120 μm |
| MD1 | 550 | n.m. | >10 | 22 | 38 | 98 |
| MD2 | 138 | 197 | 1.4 | 76 | 115 | 149 |
| RD1 | 3570 | 3576 | 1 | 49 | 60 | >150 |

TABLE 8b-continued

Calculation of viscosity and bond strength:

| | BF viscosity 50% 100 rpm | | | Bond strength 50% | | |
|---|---|---|---|---|---|---|
| | 2 h | 14 d | SI | 30 μm | 60 μm | 120 μm |
| EMS1 | n.m. | n.m. | n.m. | n.m. | n.m. | n.m. |
| EMS2 | 7080 | n.m. | >10 | 17 | 26 | 61 |
| EMS3 | 1770 | 1480 | 0.8 | 34 | 26 | 66 |
| EMS4 | 358 | 354 | 1 | 104 | 129 | >150 |
| EMS5 | 52 | 56 | 1.1 | | No bonding | |

Figure 3:
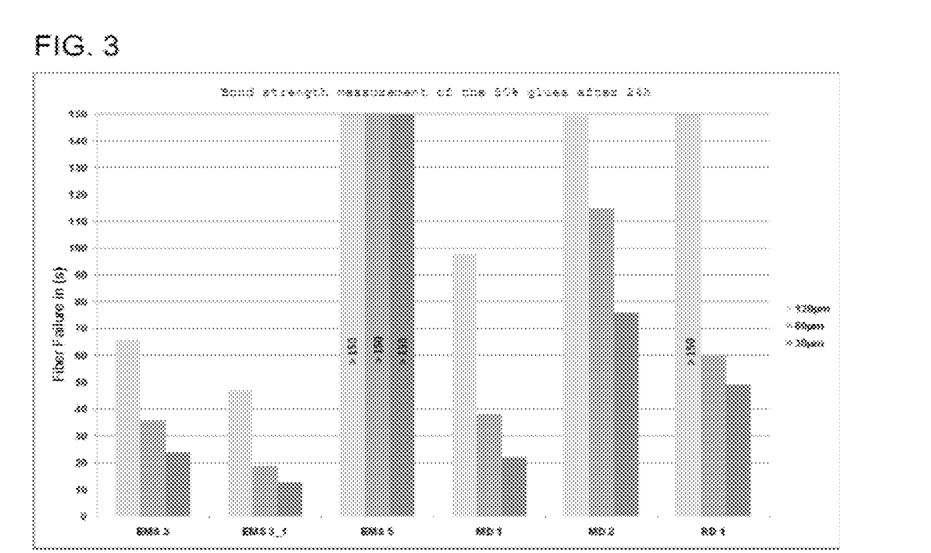
FIG. 3 is a graph showing the bond strength measurement of 50% starch solutions after 24 hours with different layer thicknesses (starches shown: MD1, MD2, RD1, EMS3; EMS3_1 is a second batch prepared in accordance with the model of EMS3)

Tables 8a and 8b shows the advantageous stability and bonding properties of the EMS starches, in particular of EMS 2, EMS3 and EMS4. These starches exhibited good bonding properties at all measured concentrations and layer thicknesses. While EMS3 and EMS4 exhibited optimal stability and bonding properties in 50% solutions, the optimum was achieved for EMS2 in a 40% composition. Further bonding strength calculations of 50% starch solutions after 24 hours are shown in FIG. 3. The stability index SI can be seen from the quotient of the viscosity calculation after 14 days by the viscosity calculation after 2 hours after preparation of the aqueous starch paste. The first viscosity measurement was taken after 2 hours in order to ensure constant conditions, in particular a constant measurement temperature.

TABLE 9 m/z numbers of the peaks of the MALDI-TOF mass spectra (FIG. 4) of the glycoamylase degradation products according to Example 8:

| MD1 | EMS4 | EMS3 | EMS4 (d) |
|---|---|---|---|
| 3433 | 3434 | 3434 | 3434 |
| 3595 | 3596 | 3595 | 3595 |
| 3757 | 3759 | 3757 | 3757 |
| 3919 | 3921 | 3920 | 3920 |
| 4082 | 4083 | 4083 | 4083 |
| 4244 | 4245 | 4244 | 4244 |
| 4407 | 4407 | 4407 | 4407 |
| 4568 | 4570 | 4569 | 4569 |
| 4730 | 4732 | 4731 | 4731 |
| 4893 | 4895 | 4894 | 4894 |

According to these results, there is no noticeable difference in the product structure, derived from the m/z distribution, in the glucoamylase-resistant starch fraction between conventional maltodextrin (MD1) and the enzymatically modified starches. This means that a similar residue remains after treatment with glucoamylase.

The invention claimed is:

1. A glue composition, comprising:
   an enzymatically branched starch having a viscosity stability index SI of less than or equal to 1.3, calculated by a quotient from viscosity after 14 days and the viscosity after 2 hours after preparation of the glue composition, wherein said starch having a mean molecular weight Mw (weight average), measured by light scattering, of 60 kDa to 3000 kDa; and
   the glue composition having a viscosity of at least 250 mPas at 22.5° C. and the starch content in the composition is at least 25% (% by weight).

2. The glue composition according to claim 1, wherein said starch has a mean degree of branching of alpha-1,6 branchings of 4 to 12%.

3. The glue composition according to claim 1, wherein said starch has a DE value of 1 at most.

4. The glue composition according to claim 1, wherein said starch is highly homogeneous, with a polydispersity index PDI between 1 and 5.

5. The glue composition according to claim 1, wherein said starch is selected from the group consisting of waxy maize starch, maize starch, potato starch, amylopectin potato starch, rice starch, wheat starch, manihot starch, and sago starch.

6. The glue composition according to claim 1, wherein a proportion of said starch makes up at least 50% of an entire starch fraction of the glue composition.

7. The glue composition according to claim 1, wherein said starch is modified by a branching enzyme which increases a degree of branching compared to unmodified starch and/or lowers polydispersity compared to unmodified starch.

8. The glue composition according to claim 7, wherein said starch branching enzyme is a branching enzyme of *Rhodothermus* sp.

9. The glue composition according to claim 1, wherein the glue composition is substantially free from low-molecular oligosaccharides with a degree of polymerization of less than 3.

10. The glue composition according to claim 9, wherein a proportion of the low-molecular oligosaccharides is less than 5% by weight of a starch mass.

11. The glue composition according to claim 7, wherein said starch branching enzyme is selected from the group consisting of 1,4-α-D-glucan and 1,4-α-D-glucan 6-α-D-(1, 4-α-D-glucano)-transferase (E.C. 2.4.1.18).

12. The glue composition according to claim 1, wherein said starch has a mean molecular weight Mw (weight average), measured by light scattering of at least 70 kDa.

13. The glue composition according to claim 1, wherein said starch has a mean molecular weight Mw (weight average), measured by light scattering of at least 80 kDa.

14. The glue composition according to claim 1, wherein said starch has a mean molecular weight Mw (weight average), measured by light scattering of at least 90 kDa.

15. The glue composition according to claim 1, wherein said starch has a mean molecular weight Mw (weight average), measured by light scattering of up to 2500 kDa.

16. The glue composition according to claim 1, wherein said starch has a mean molecular weight Mw (weight average), measured by light scattering of up to 2000 kDa.

17. The glue composition according to claim 1, wherein said starch has a mean molecular weight Mw (weight average), measured by light scattering of up to 1500 kDa.

18. The glue composition according to claim 1, wherein said starch has a mean molecular weight Mw (weight average), measured by light scattering of up to 1000 kDa.

19. The glue composition according to claim 1, wherein said starch has a mean molecular weight Mw (weight average), measured by light scattering of up to 800 kDa.

20. The glue composition according to claim 1, wherein said starch has a mean molecular weight Mw (weight average), measured by light scattering of up to 600 kDa.

21. The glue composition according to claim 1, wherein said starch has a mean molecular weight Mw (weight average), measured by light scattering of up to 400 kDa.

22. The glue composition according to claim 1, wherein said starch has a mean molecular weight Mw (weight average), measured by light scattering of up to 200 kDa.

23. The glue composition according to claim 1, wherein said starch has a mean molecular weight Mw (weight average), measured by light scattering of up to 150 kDa.

24. The glue composition according to claim 1, wherein said starch has a mean molecular weight Mw (weight average), measured by light scattering of up to 140 kDa.

25. The glue composition according to claim 1, wherein said starch has a mean molecular weight Mw (weight average), measured by light scattering of up to 135 kDa.

26. The glue composition according to claim 1, wherein said starch has a mean molecular weight Mw (weight average), measured by light scattering of up to 130 kDa.

27. The glue composition according to claim 1, wherein said starch has a mean molecular weight Mw (weight average), measured by light scattering of up to 125 kDa.

28. The glue composition according to claim 1, wherein the glue composition has a viscosity of least 300 mPas at 22.5° C. when said starch content in the composition is at least 25%.

29. The glue composition according to claim 1, wherein the glue composition has a viscosity of least 400 mPas at 22.5° C. when said starch content in the composition is at least 25%.

30. The glue composition according to claim 1, wherein the glue composition has a viscosity of least 500 mPas at 22.5° C. when said starch content in the composition is at least 25%.

31. The glue composition according to claim 1, wherein the glue composition has a viscosity of least 1200 mPas at 22.5° C. when said starch content in the composition is at least 25%.

32. The glue composition according to claim 1, wherein the glue composition has a viscosity of least 1500 mPas at 22.5° C. determined using Brookfield testing procedures.

33. A method of using glue, which comprises the steps of:
   providing a glue composition according to claim 1, the glue composition functioning as an adhesion promoter; and
   using the glue composition as a gluing agent or a laminating agent for at least one of paper products, cardboard products, and displays made from paper or cardboard.

34. A glued product, comprising:
   a glue composition according to claim 1, said glue composition functioning as an adhesion promoter; and
   a product selected from the group consisting of paper formed from at least two layers and cardboard formed from at least two layers, wherein at least one of said two layers is bonded by said glue composition and at least one of said two layers has a printed or printable flat surface, on a side of said layer opposite a side to be glued.

35. A method for gluing a product, which comprises the steps of:
   providing a glue composition according to claim 1, the glue composition functioning as an adhesion promoter; and
   applying the glue composition onto a side of a product to be glued.

36. A method for preparing a glue composition according to claim 1 by enzymatic modification, which comprises the step of:
   contacting a starting starch with a branching enzyme in an amount with an activity of 50 BEU to 20,000 BEU per gram of the starting starch.

37. The method according to claim 36, which further comprises providing *Rhodothermus* sp. as the branching enzyme in an amount with an activity of 80 BEU to 10,000 BEU per gram of the starting starch.

38. A method for preparing a glue composition according to claim 1, which comprises the step of:
   contacting the starch with a branching enzyme and in that a mean molar mass of a desired modified starch product is controlled by a starting amount of the branching enzyme per starting starch (amount by weight).

39. The method according to claim 38, which further comprises providing *Rhodothermus* sp. as the branching enzyme.

40. A method for preparing a glue composition according to claim 1, which comprises the steps of:
   modifying enzymatically the starch; and
   mixing the starch with an aqueous solvent.

41. The method according to claim 40, which further comprises mixing in a filler selected from the group consisting of a silicate, a salt, buffer components, acids, bases and a biocide.

42. A starch-based glue composition, comprising:
   an enzymatically branched starch obtainable by contacting a starting starch with a branching enzyme with an activity of 50 BEU to 20,000 BEU of starting starch, whereby
   the glue composition having a viscosity of at least 250 m Pas at 22.5° C. and the starch content in the composition is at least 25% (% by weight).

43. The starch-based glue composition according to claim 42, wherein said branching enzyme is of *Rhodothermus* sp. with an activity of 80 BEU to 10,000 BEU per gram of the starting starch.

* * * * *